H. I. MORRIS.
DRIVE CONTROL MEANS.
APPLICATION FILED DEC. 1, 1916.
1,322,041.
Patented Nov. 18, 1919.
2 SHEETS—SHEET 1.
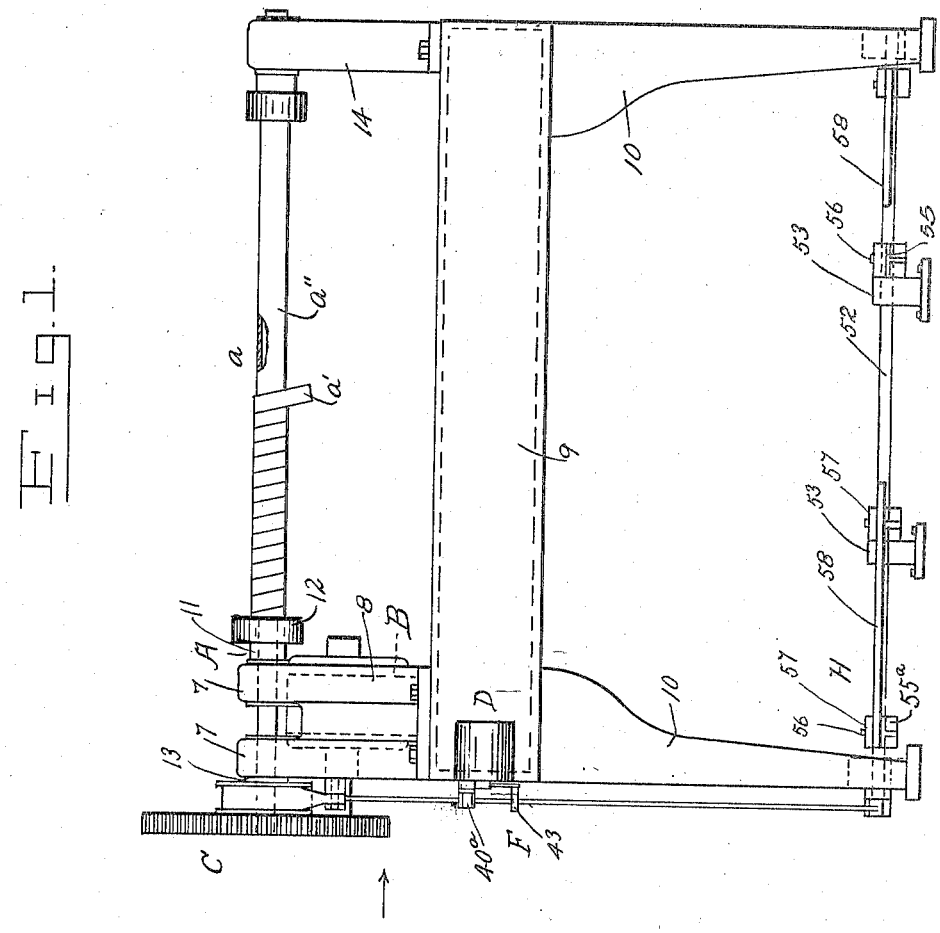
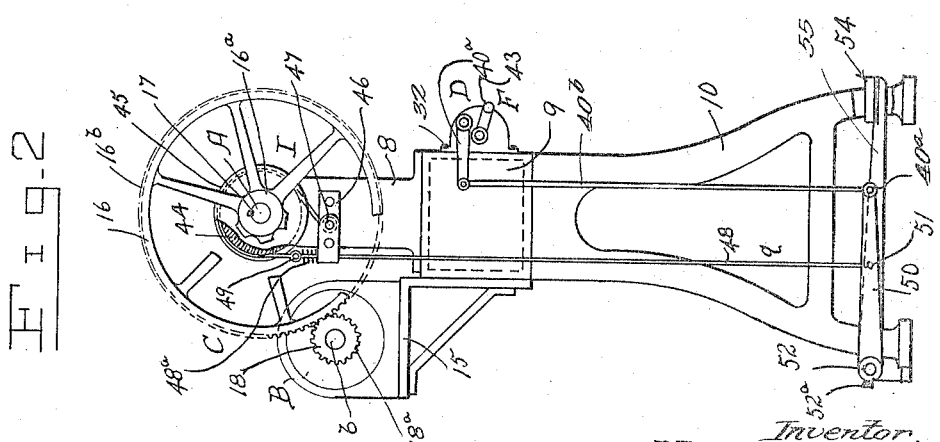

H. I. MORRIS.
DRIVE CONTROL MEANS.
APPLICATION FILED DEC. 1, 1916.

1,322,041.

Patented Nov. 18, 1919.
2 SHEETS—SHEET 2.

Witnesses,
H. Gearing
Alfred H. Daehler

Inventor,
Howard I. Morris;
By Raymond ????
His Attorney.

UNITED STATES PATENT OFFICE.

HOWARD I. MORRIS, OF SAN DIEGO, CALIFORNIA, ASSIGNOR TO THE SAVAGE TIRE COMPANY, OF SAN DIEGO, CALIFORNIA, A CORPORATION OF CALIFORNIA.

DRIVE-CONTROL MEANS.

1,322,041.     Specification of Letters Patent.     Patented Nov. 18, 1919.

Application filed December 1, 1916. Serial No. 134,478.

*To all whom it may concern:*

Be it known that I, HOWARD I. MORRIS, a citizen of the United States, residing at San Diego, in the county of San Diego and State of California, have invented new and useful Improvements in Drive-Control Means, of which the following is a specification.

This invention relates to drive control means and more particularly to means whereby a wide variety of means, mechanisms and devices may be controlled as to operativeness, and whereby the application of power to such means, mechanisms or devices may be controlled as well as the cutting off of such power and braking means drawn into operation. A particular field of usefulness for the invention is in tire tube wrapping machines and the like, wherein a spindle is rotated by a suitable motor, and it is necessary to start such spindle for each tube to be wrapped and after the wrapping operation to stop the spindle at the proper time. In accordance with the invention an electric motor is employed to drive the spindle, the motor being operatively connected therewith through suitable gearing, the spindle being mounted on suitable bearings, the control of the electrical energy supplied such motor being through a suitably organized switch which may be manually drawn into motor operating position where it is detained until the particular operation being performed is completed, whereupon from a suitable pedal or the like the switch may be released, cutting off the electrical energy being supplied the motor, and at the same time that braking means are applied to a suitable braking surface provided on the spindle. This simultaneous operation of braking means and switch releasing greatly facilitates the control of the mechanism embodying the control means or with which the control means are associated, particularly as control of the spindle with respect to stopping the same may be had from a point remote from the switch as the operating pedal may be extended along the machine base so that an operator may from any position along the frame of the machine, by application of pressure to the pedal release through suitable mechanism, the electrical switch which is urged to open position and simultaneously, through the agency of the said foot pedal, apply braking means to the spindle to stop the rotation thereof; as tire wrapping machines are sometimes of considerable length, this form of control is especially well adapted for use in connection with the same. In the preferred form of the invention, an electric switch blade or member is mounted for oscillation upon a short shaft, such switch blade being insulated from the shaft and arranged to be thrown into and out of contact with a plurality of fixed switch points across which the blade is drawn to close the circuit and supply electrical energy from a suitable source to the motor which motor is preferably mounted on the spindle head of the machine and may directly drive the spindle through a suitable pinion and gear arrangement, and means are provided for urging the shaft in such direction of rotation as will cause the switch blade to be withdrawn from the points to break the circuit when permitted so to do by throwing into inoperative position releasable latch means normally tending to maintain the switch points in either open or closed position. It is the simultaneous actuation of the switch releasing means and the spindle braking means that properly permits the spindle to be stopped by mere pressure applied by the foot of an operator, the pedal being suitably connected with the switch releasing mechanism and braking means to that end.

A further object of the invention is to provide simultaneously operable braking and energy interrupting means which will be relatively simple and inexpensive in construction and organization and whereby an operator may manually throw the switch controlling the electrical energy to start the machine or device in connection with which the control means are used, and whereby at the proper point in the progress of the work, he may readily release such switch, permitting the same to return to open position. and by the same movement apply braking means to operating machine parts.

With the above and other objects in view, the invention consists in the novel and useful provision, formation, combination, association and relative arrangement of parts, members and features, all as hereinafter described, shown in the drawings and finally pointed out in claims.

In the drawings:

Figure 1 is a front elevation of a tire wrapping machine constructed and organized in accordance with the invention and embodying the same;

Fig. 2 is an end elevation of the tire wrapping machine shown in Fig. 1 and looking in the direction of the arrow near Fig. 1, parts being broken away and sectioned for clearness of illustration;

Corresponding parts in all the figures are designated by the same reference characters.

Figure 5:
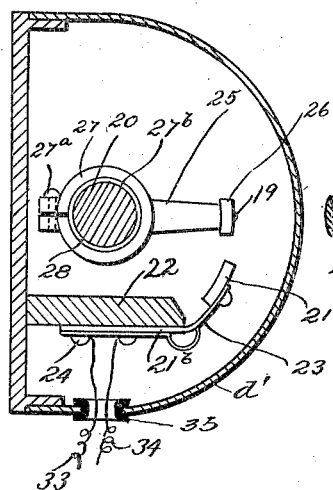
Fig. 5 is a sectional view taken on the line $x^5$—$x^5$, Fig. 4, and looking in the direction of the appended arrows.
Figure 4:
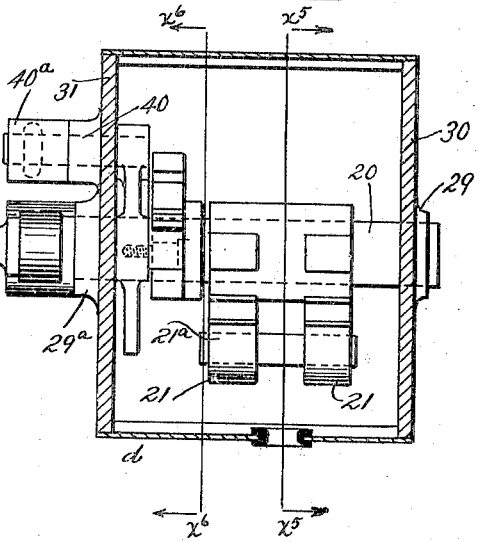
Fig. 4 is a sectional view through the casing shown in Fig. 3, showing parts in elevation, and taken on the line $x^4$—$x^4$, Fig. 3, and looking in the direction of the appended arrows.
Figure 3:
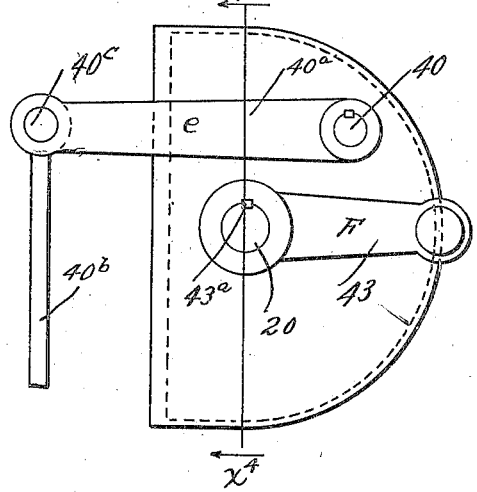
Fig. 3 is an end elevation of the switch box shown in Figs. 1 and 2, the view being taken upon an enlarged scale.
Figure 6:
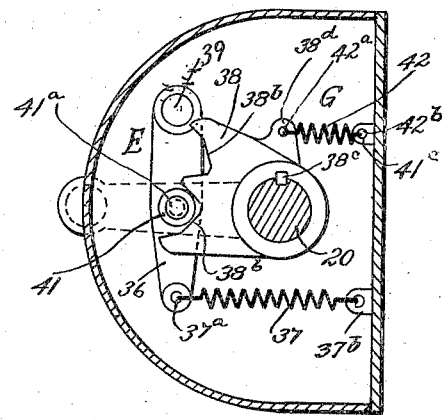
Fig. 6 is a sectional view taken on the line $x^6$—$x^6$, Fig. 4, and looking in the direction of the appended arrows.

Referring with particularity to the drawings, in the embodiment of the invention therein shown, A designates a spindle adapted to rotate a mandrel or the like $a$ upon which a tube may be wrapped, B designates an electric motor for driving the spindle A, C designates transmission means for transmitting power from the motor to the spindle A, D designates an electric switch whereby the supply of electrical energy to the motor may be controlled, E designates detaining means for the electric switch D, to maintain the same, until suitably released, in closed position, F designates means for throwing the switch D into closed position, G designates means urging the switch toward open position and for throwing the switch to open position when permitted so to do by the detaining means E, I designates braking means for the spindle, and H designates means whereby both the braking means and the releasable means E may be conjointly actuated, to the end that, the electrical energy to the motor will be cut off at the switch and the braking means applied to the spindle to stop the rotation thereof when a tube has been completely wrapped and it is desirable to replace the same by another tube.

The spindle A is shown as journaled in suitable journal boxes 7, such journal boxes being provided on a head 8 mounted upon a suitable longitudinally ranging frame member 9, which in turn is supported from the floor by legs 10 provided at each end of the member 9. The spindle is prevented from endwise displacement by a collar 11 provided thereon at the inner end of the spindle and adjacent to a chuck or the like 12, and the hub 13 of a portion of the braking means I which is secured to the other end of the spindle A. A tail-stock or the like 14 may be provided at the end of the frame member 9 opposite the spindle-carrying head 8 and such tail-stock may be arranged to properly rotatably support an end of the mandrel $a$ upon which a pneumatic tube is supported and wrapped.

The motor B, shown as an electric motor of standard form is connected with the member 9 adjacent to the head 8 by means of the bracket 15, and is in position to properly transmit power to the spindle through the transmission gearing C. This gearing comprises a spur gear 16 fixedly mounted upon the spindle A as at 17, and a pinion 18 mounted upon the shaft $b$ of the electric motor B. The gear 16 may have features of the braking means I formed integrally therewith and at the hub $16^a$ thereof. The gear 16 is mounted at the outer end of the spindle A, that is, the overhanging end of the spindle opposite the chuck-carrying end, and the pinion 18 of the motor is arranged for rotation in the same plane as the gear 16 to provide for proper meshing of the teeth $16^b$ of the gear 16 with the teeth $18^a$ of the pinion 18. The electric switch D is shown as comprising a switch blade 19 carried upon an oscillatory shaft 20, and a plurality of switch points 21 suitably supported by a bracket 22 of insulating material. The switch points 21 may each comprise a point proper $21^a$ supported at the end of a strip $21^b$ of conducting material and pressed into the path of the switch blade 19 by means of a spring 23 lying under the conducting strip $21^b$ and assembled therewith and with the shelf or bracket 22 as by means of screws or the like 24 passed through the spring 23 and strip $21^b$ and into the bracket 22. The points 21 are disposed in the arcuate path of the switch blade 19 which is spaced from the oscillatory shaft 20 as by a supporting arm 25 to which the switch blade is secured as at 26. The arm 25 is formed with a split boss 27 which is clamped onto the oscillatory shaft 20 by means of a screw $27^a$, a bushing 28 of insulating material being interposed between the boss 27, which is bored slightly larger than the shaft 20 as at $27^b$, and the shaft 20 to prevent electrical connection being made as between the shaft 20 and the other switch features. The shaft 20 is mounted in suitable journals 29 and $29^a$ provided in end walls 30 and 31, respectively, of a switch housing $d$, which switch housing may be semicircular in form and secured to the frame member 9 as at 32. Circuit wires 33 and 34 enter the curved wall $d'$ of the housing $d$ through a suitable insulating bushing 35 and such wires are connected, one with each of the switch points 21. The switch points 21 are spaced apart and the switch blade 19 is of proper length to bridge the gap between the switch points 21.

The releasable means E is shown as comprising an oscillatory arm 36, a tension spring 37, a notched plate 38 provided on the oscillatory shaft 20, and means of operative connection e between the arm 36 and other control features, as will be presently described. The arm 36 is secured to a short shaft 39 extending into the housing d and journaled in the wall thereof as at 40, and such arm 36 carries a roller 41 secured thereto as by means of a pivot 41ª and in the plane of the plate 38. The spring 37 is connected to the end of the arm 36 opposite the end which is secured to the shaft 40 as at 37ª and the opposite end of the spring is connected to housing d by securing the same to a lug or ear 37ᵇ springing from such housing and extending inwardly thereof. The outer end of the shaft 40 is provided with a lever 40ª comprised within the operating means e, such means further comprising a connecting link 40ᵇ having one of its ends pivotally connected with the lever 40ª as at 40ᶜ and having its other end connected with features of the pedal mechanism as at 40ᵈ. The plate 38 is provided with an upper notch 38ª and a lower notch 38ᵇ in a peripheral portion thereof and such plate is keyed to the shaft 20 as at 38ᶜ. A radial extension 38ᵈ is provided on the plate and one end of a contractile spring 42 is secured to such radial extension, the other end of the spring being secured to an ear 41ᶜ springing from the housing wall. The spring 42 urges the plate, and through it the shaft 20 and the switch blade 19 in such direction as will tend to maintain the switch in open position and the switch blade out of contact with the switch points 21. The roller 41 on the arm 36 is adapted to take into either the notch 38ª or the notch 38ᵇ of the plate 38 and through the tension of the spring 37, which is stronger than the spring 42 maintaining the switch in closed position when the switch has been so thrown and the roller is in the notch 38ᵇ, or the switch being in the opposite position and the roller in the notch 38ª the tendency will be to so maintain the switch in open position.

The means F may comprise a switch handle 43 secured to the shaft 20 as at 43ª, and such switch handle 43 is preferably provided exteriorly of the casing or housing d and adapted to be manually actuated, the switch blade 19 in the housing being thrown upon proper movement of the handle 43.

The braking means I preferably comprises a brake drum 44 formed integrally with the hub 16ª of the gear 16 and fixedly secured to the spindle A therewith, a brake band 45 partially encircling said brake drum and secured at one of its ends to a suitable bracket 46 springing from the head 8 as at 47, and means g secured to the other end of the brake band 45 for constricting the same to stop the spindle. The operating means g preferably comprises a link 48 connected at one of its ends to the brake band end as at 49, a lever 50 with which the other end of the link 48 is connected as at 51, a pedal supporting rock shaft 52 journaled in pillow blocks 53 springing from the floor at the base of the framework of the machine, and a pedal 54 ranging along the machine bed or frame throughout the length thereof. The lever arm 50 may be secured to the shaft 52 as by a set screw 52ª. The pedal may be formed by a plurality of forwardly ranging arms or levers 55 each mounted upon and secured to the shaft 52 as by set screws 56 passed through bosses 57 formed on the lever arms, and a footboard or treadle 58 mounted on the forward end of the lever arms 55 as at 55ª. This arrangement of lever 50, shaft 52, and pedal features, constitutes the means H whereby the braking means and the switch may be conjointly actuated, as the link 48 will draw the brake band to constrict the same and seize the brake drum 44 while the link 40ᵇ secured to the lever 50 will operate the releasable means and allow the urging means or spring 42 to throw the switch to open position to cut off the supply of electrical energy to the motor. The link 48 may pass through the bracket 46 and a compression spring 48ª may be provided between the bracket and the brake band end at 49 to return the brake band to open or brake drum releasing position.

The operation, method of use and advantages of the improved drive control means will be readily understood from the foregoing description, taken in connection with the accompanying drawings and the following statement:

A tube or the like may be placed in position for rotation by the spindle by properly manipulating the chuck or tail-stock features of the device, and the electric switch controlling handle 43 thrown in such direction as will rotate the shaft 20 to throw the blade 19 into contact with the points 21 whereupon electrical energy will be supplied the motor from a suitable source of supply with which the circuit wires 33 and 34 are connected. The motor will drive the spindle through the transmission gearing C and the tube to be wrapped or other work to be rotated will be rotated by the spindle as the wrapping proceeds, as for instance by the winding of tape shown at a' on the tube shown at a'', the operator may position himself at any point along the length of the machine and after the tube has been completely wound and the spindle is to be stopped, all that is necessary is to step upon the treadle 58, drawing down the lever 50 through the rock shaft 52 and through the lever drawing downwardly on the links 48 and 40ᵇ, the link 48 constricting the brake band 45 and causing the same to seize the brake drum 44, thus frictionally retarding or stopping the spindle, while at the same movement the drawing down of the link 40ᵇ caused the movement of the arm or lever 40ᵃ and caused the rocking of the shaft 40 in the proper direction to move the arm 36 against its spring 37 and draw the roller 41 from the notch 38ᵇ in the plate 38 where such roller was positioned by the closing of the switch. When, through pedal action, the roller is held out of the notched portion of the plate 38 the urging means G will cause movement of the plate and with the same the shaft 20 and the switch blade 19 and throw the switch to open position. After replacement of a tube $a$ on the spindle, the spindle may be again started by manually depressing the switch handle 43, moving the plate 38 and switch blade in the housing, and causing the roller 41 to enter the upper notch 38ᵇ to hold the switch in closed position until again released by voluntary pedal actuation. The spring 37 furnishes the proper amount of resistance to movement of the arm 36 and the roller 41 carried thereby so that upon application of proper pressure to the switch handle the switch may be thrown to closed position.

Having thus disclosed my invention, I claim and desire to secure by Letters Patent:

1. In mechanism of the character disclosed, a driven part, motive means for driving said part, an electrical switch controlling the supply of energy to said motive means, means urging said switch to open position, releasable means for blocking the action of said urging means, braking means, and means whereby said releasable means and said braking means may be conjointly actuated to simultaneously permit said urging means to throw said switch to open position and retard said driven part; said braking means comprising a member on said driven part and a further member adapted to be applied to said first named member; said actuating means comprising a pedal, means of operative connection between said pedal and said braking means, and means of operative connection between said pedal and said releasable means.

2. In mechanism of the character disclosed, a driven part, motive means for driving said part, an electrical switch controlling the supply of energy to said motive means, means urging said switch to open position, releasable means for blocking the action of said urging means, braking means, and means whereby said releasable means and said braking means may be conjointly actuated to simultaneously permit said urging means to throw said switch to open position and retard said driven part; said braking means comprising a member on said driven part and a further member adapted to be applied to said first named member; said actuating means comprising a pedal, means of operative connection between said pedal and said braking means, and means of operative connection between said pedal and said releasable means; said switch being provided with means coacting with said releasable means.

3. In mechanism of the character disclosed, a driven spindle, a suitable support for said spindle, motive means, means of operative connection between said spindle and said motive means and whereby said spindle is driven by said motive means, means for supplying electrical energy to said motive means, means for interrupting the path of said electrical energy, releasable means for preventing the actuation of said interrupting means, a brake drum on said spindle, a member adapted to co-act with said brake drum in braking action, and means whereby said member and said releasable means may be simultaneously actuated; said actuating means comprising a pedal, and means connecting said pedal with both said releasable means and said braking member.

4. In mechanism of the character disclosed, a driven spindle, a suitable support for said spindle, motive means, means of operative connection between said spindle and said motive means and whereby said spindle is driven by said motive means, means for supplying electrical energy to said motive means, means for interrupting the path of said electrical energy, releasable means for preventing the actuation of said interrupting means, a brake drum on said spindle, a member adapted to co-act with said brake drum in braking action, and means whereby said member and said releasable means may be simultaneously actuated; said actuating means comprising a pedal, and means connecting said pedal with both said releasable means and said braking member; said releasable means comprising an oscillatory member, and means normally urging said member into engagement with features of said circuit closing means.

In testimony whereof, I have signed my name to this specification in the presence of two subscribing witnesses.

HOWARD I. MORRIS.

Witnesses:
CLAUS SPRECKLES,
ARTHUR J. SAVAGE.